US005373449A

United States Patent [19]

Baker

[11] Patent Number: 5,373,449
[45] Date of Patent: Dec. 13, 1994

[54] METHOD OF PRODUCING A MULTI-APERTURED WORKPIECE

[75] Inventor: George E. Baker, Leire, England

[73] Assignee: Amchem Company Limited, Leicestershire, England

[21] Appl. No.: 683,720

[22] Filed: Apr. 11, 1991

Related U.S. Application Data

[63] Continuation-in-part of Ser. No. 391,965, Aug. 10, 1989, abandoned.

[30] Foreign Application Priority Data

Aug. 13, 1988 [GB] United Kingdom ............... 8819321
Oct. 25, 1988 [GB] United Kingdom ............... 8824917

[51] Int. Cl.$^5$ .................. G06F 15/46; G05B 19/18; B23H 9/14
[52] U.S. Cl. .................. 364/474.04; 364/474.15; 219/69.17
[58] Field of Search .............. 364/474.04, 474.15, 364/474.06, 474.08, 509, 510; 219/69.14, 69.17, 69.18, 69.11, 69.15

[56] References Cited

U.S. PATENT DOCUMENTS

| | | |
|---|---|---|
| 4,709,131 | 11/1987 | Del Bello et al. ............... 219/69.14 |
| 4,725,705 | 2/1988 | Holland-Moritz et al. ..... 364/474.15 |
| 4,733,041 | 3/1988 | Obara .............................. 219/69.14 |
| 4,980,532 | 12/1990 | Morishita ........................ 364/474.04 |
| 4,995,949 | 2/1991 | Rhoades ........................... 219/69.17 |
| 5,010,224 | 4/1991 | Shirey et al. .................... 219/69.17 |
| 5,051,912 | 9/1991 | Johanson et al. .............. 364/474.04 |

Primary Examiner—Paul Gordon
Attorney, Agent, or Firm—Longacre & White

[57] ABSTRACT

A method of producing a multi-apertured workpiece such as a fuel injector comprising forming an aperture in a workpiece by EDM machining (10), supplying a calibrating fluid such as deionized water through the aperture from a reservoir (17) via a pump (18), measuring the flow and pressure through the aperture by transducers (19, 20) and comparing the results with a predetermined ideal, adjusting the EDM machine (10) in accordance with such comparison so as to compensate for the difference between the measured values and the predetermined ideal, forming a further aperture using the adjusted EDM machine (10) and repeating the preceding steps until the appropriate number of apertures has been formed. The apparatus may include CNC operation (14) and the comparison may be made by computer (15) linked to the CNC (14) for adjusting the EDM machine (10).

10 Claims, 7 Drawing Sheets

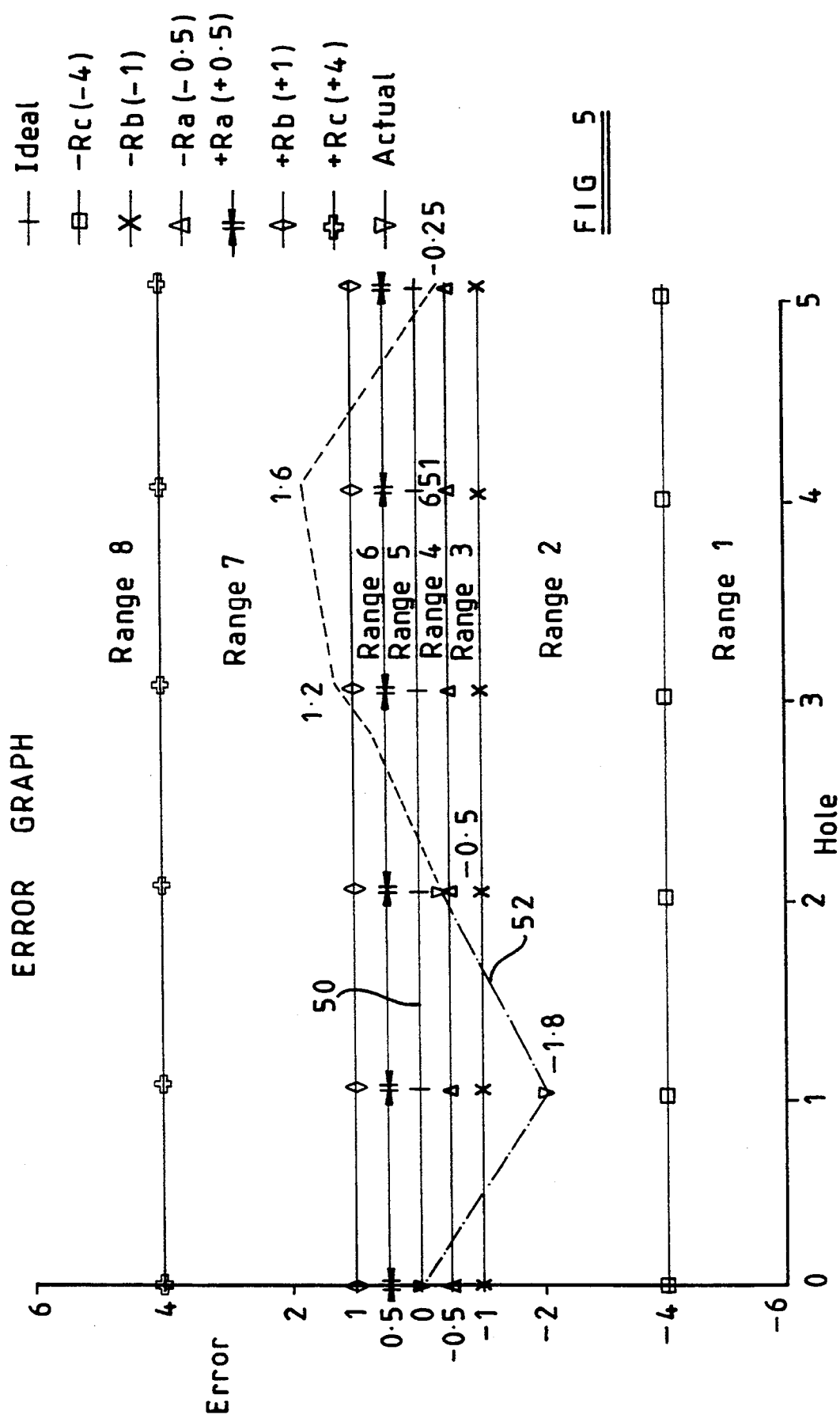

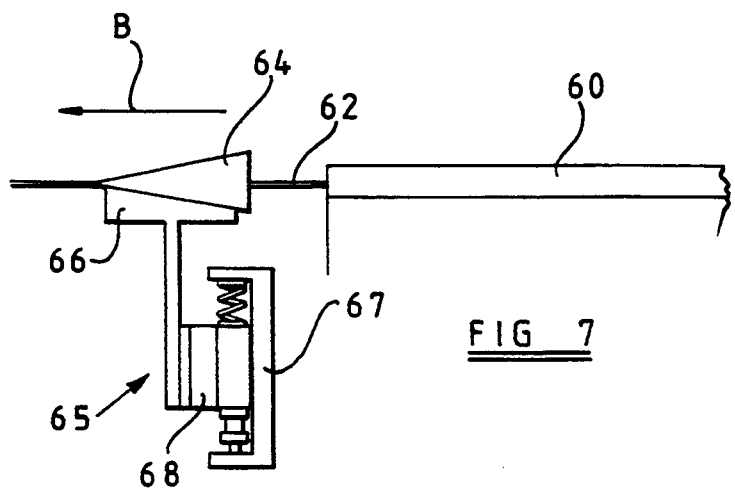
FIG 7
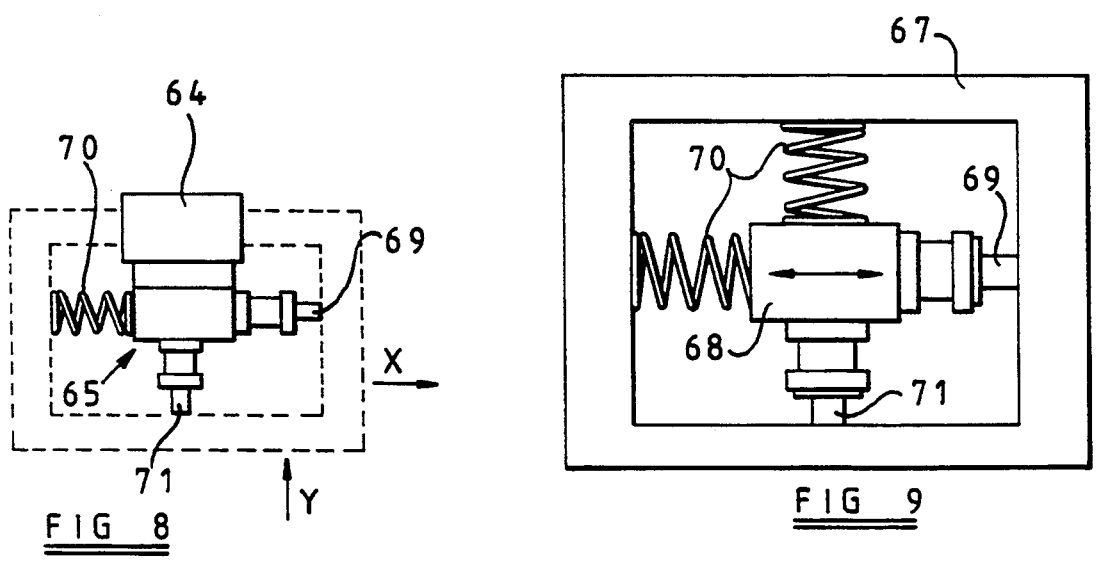
FIG 8
FIG 9
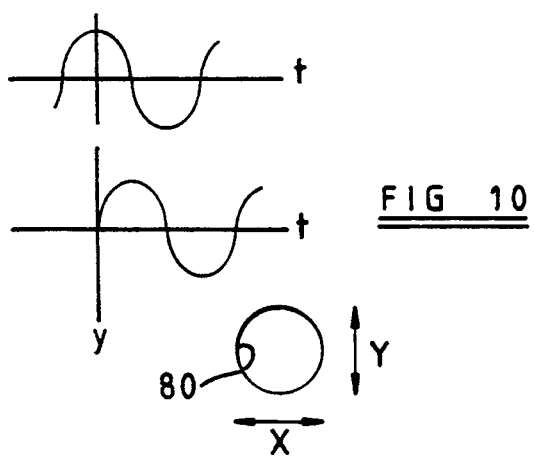
FIG 10

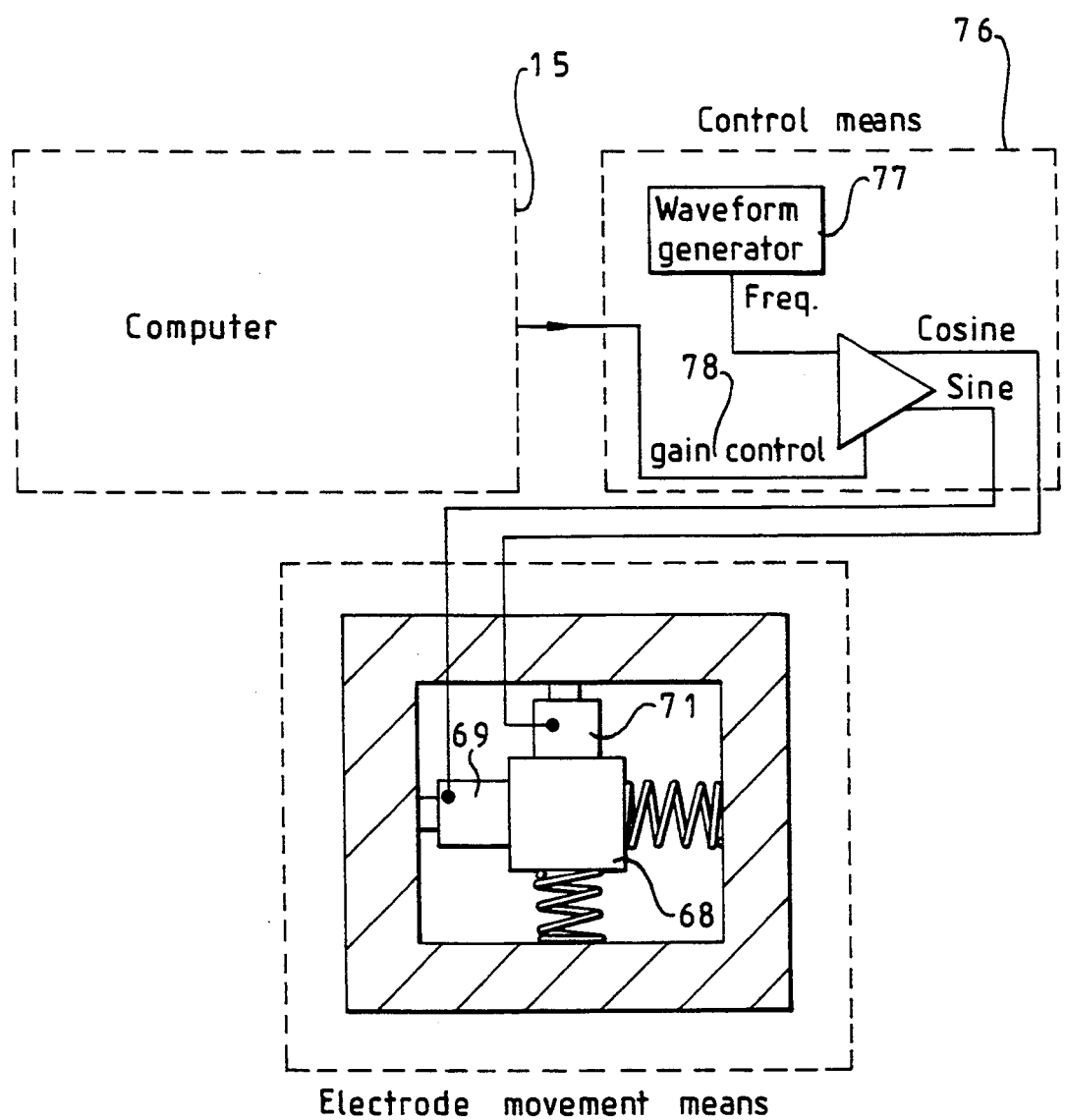

METHOD OF PRODUCING A MULTI-APERTURED WORKPIECE

The instant application is a continuation-in-part of now abandoned parent application Ser. No. 07/391,965 filed Aug. 10, 1989.

The present invention relates to a method of producing a multi-apertured workpiece such as a multi-apertured fuel injector and also to a production apparatus.

Fuel injectors for which the present invention is particularly applicable are used in compression ignition or "diesel" engines in which fuel is injected directly into a combustion chamber and is caused to atomise by the design of the injector. Such injectors often have a number of apertures and where more than one injector is used, such as in multi cylinder engines, it is desirable that all injectors should perform in as similar a manner as possible.

Viewed from a first aspect, it is an object of the present invention to provide a method of producing a multi-apertured workpiece conforming closely to design parameters.

In accordance with the first aspect of the invention, there is provided a method of producing a multi-apertured workpiece having a given overall flow rate through all the apertures comprising, forming a first aperture in a workpiece by electrode discharge machining;

supplying a calibrating fluid through said formed aperture;

measuring the flow and pressure of the calibrating fluid through the first aperture and comparing the results with a predetermined ideal;

adjusting the parameters of the EDM machine in accordance with the difference between the measured flow and pressure reading and the predetermined ideal so as to compensate for the difference between said measured value and said predetermined ideal;

forming a second aperture using the adjusted aperture forming device and repeating the preceding steps until the appropriate number of apertures has been formed.

It is preferred that the pressure and flow measurements are made as the position of the workpiece is adjusted in between aperture forming steps.

In a particularly preferred embodiment, the pressure and flow measurements are fed directly to a computer which in turn is connected directly to an EDM control device. When an EDM device is used, the measuring fluid is conveniently deionized water.

The moveable assembly may be moved by an arrangement of piezoelectric crystals which are subjected to operating voltages modified in accordance with said control signals to produce orbital motion on X and Y axes in the orbital plane.

Alternatively, the moveable assembly may be moved on X and Y axes by servo-motor means operating in accordance with said control signals.

It is also an object of a further aspect of the present invention to provide an apparatus for producing a multi-apertured workpiece conforming closely to design parameters.

According to this further aspect, the invention provides apparatus for producing a multi-apertured workpiece, the apparatus comprising;

a holder for a workpiece;

an EDM machine for forming an aperture in the workpiece;

a fluid supply line adapted to supply fluid through a first aperture after the first aperture and prior to the forming of a second aperture pressure and flow transducers in said supply line for providing electrical signals representative of the pressure and flow rate of the fluid through the aperture;

comparator means for comparing the outputs of the pressure and flow transducers to a predetermined ideal; and adjustment means for adjusting the operating parameters of the EDM machine in response to the result of such comparison.

Apparatus embodying the invention will now described in more detail by way of example only with reference to the accompanying schematic drawings in which:

FIG. 5 is a graph showing the variation from the ideal of the flow rate through a workpiece in dependence upon the number of apertures in the workpiece.

FIG. 7 is a diagrammatic side elevation of a further embodiment of an EDM machine in accordance with the present invention;

FIG. 8 is a front view of the machine of FIG. 7;

FIG. 9 is an enlarged view schematically illustrating a moveable assembly within the machine of FIGS. 7 and 8;

FIG. 10 illustrates graphically the orbiting of an electrode of the machine of FIGS. 7 and 8; and FIG. 11 is a block diagram illustrating operation of the machine of FIGS. 7 and 8.

Figure 1:
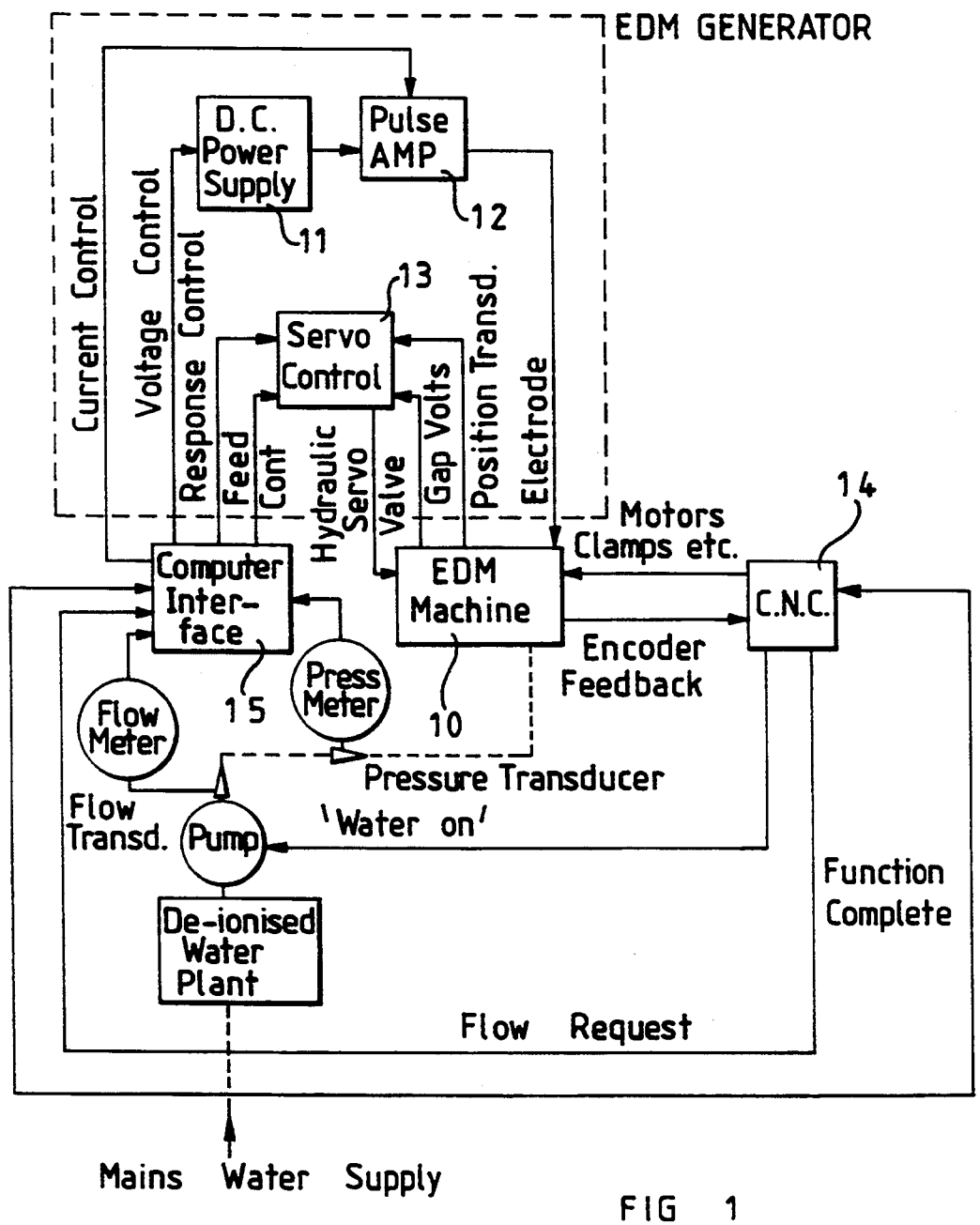
FIG. 1 is a block diagram of an apparatus for producing a multi-apertured workpiece.

Referring to FIG. 1 of the drawings, an EDM machine 10 is supplied with power from a DC supply 11 through a pulse amplifier 12. Servo controls 13 are used to control the operation of EDM machining in generally known manner.

A computer numerical control (CNC) device 14 controls the machining operation. A computer interface 15 associated with the CNC device is used in a manner to be described to control calibration of apertures machined in the workpiece by the EDM machine 10.

Figure 2:
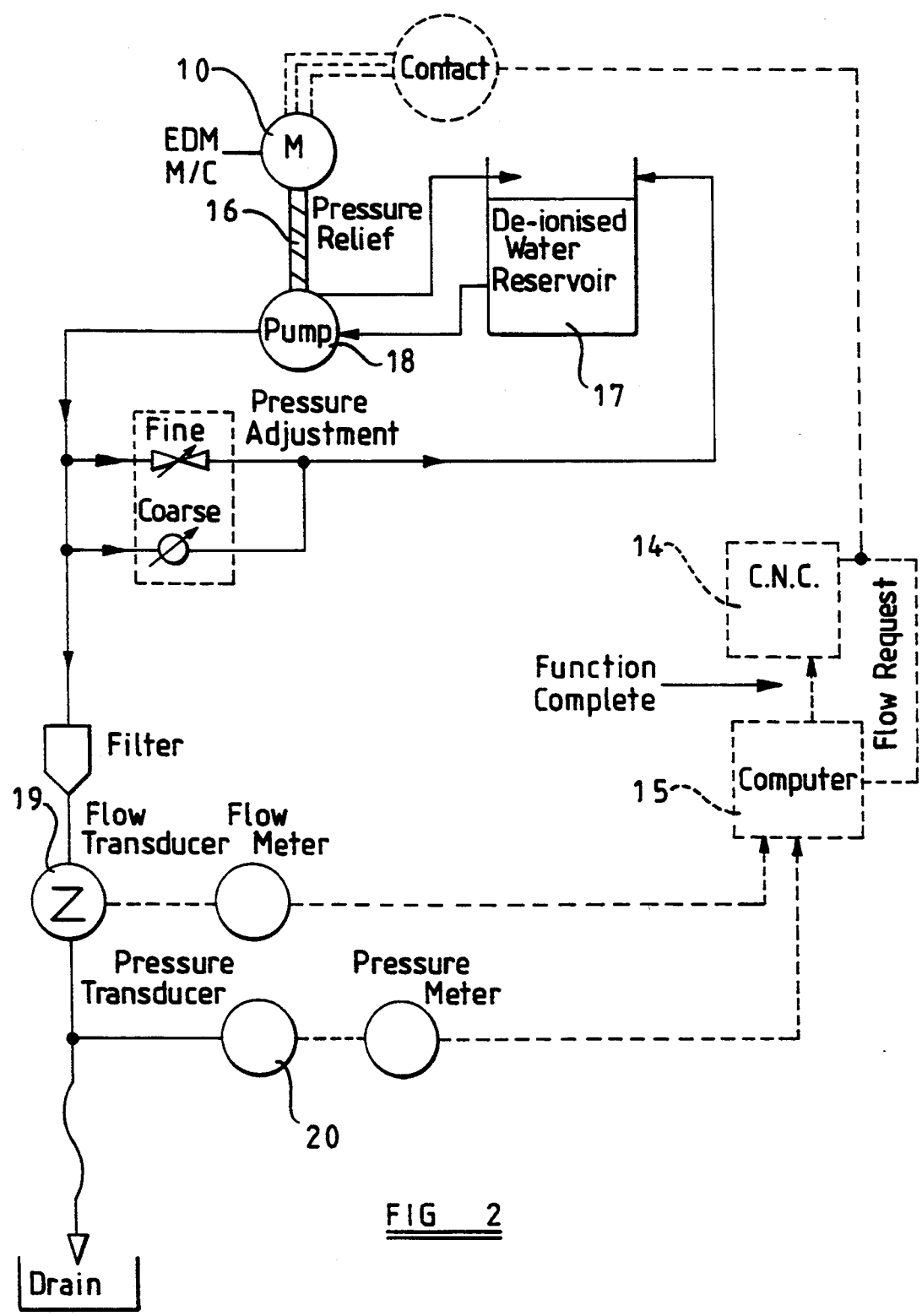
FIG. 2 is a block diagram of a calibration system embodied in the apparatus.

In operation, the EDM machine 10 machines a first aperture in the workpiece and then a calibration operation is performed using the calibration system diagrammatically illustrated in FIG. 2 to measure the performance of the workpiece with the first aperture.

The calibration system of the EDM machine 10 has a fluid supply 16 which is supplied with deionised water from a reservoir 17. The water is pumped using a pump 18. A flow transducer 19 and pressure transducer 20 monitor the flow and pressure respectively of the deionised water. During calibration, the deionised water is fed through the aperture which has been machined in the workpiece (FIG. 6) and output signals from the transducers 19 and 20 representing the flow rate and pressure values of the pumped water are fed to the computer interface 15. These values are a measure of the performance of the workpiece and are compared by the CNC 14 with the target values for one aperture stored by the computer 15. The machining parameters of the EDM machine 10 are then adjusted in dependence on the comparison to machine a second aperture of a size to bring the actual flow rate and pressure for two apertures closer to the target values.

Calibration takes place between machining operations of the EDM machine 10, that is between the formation of successive apertures.

Deionised water is used as the measuring fluid for reasons of health and safety and also because of its reduced conductivity compared to ordinary water. This latter feature is especially important when an EDM device is used to form the apertures. However, the performance of fuel injectors is normally measured using calibration oil at a pressure of about 2000 psi and the actual flow rate is measured in pounds per hour (pph) at this pressure. This naturally differs from the result achieved with deionised water due to the differences in viscosities and mechanical properties of the two liquids and so it is necessary to correlate one with the other. The figures for achieving this can be determined by observation under standard conditions and the necessary correlation and calculation can be performed by the computer 15. The latter can convert the values obtained from the transducers 19, 20 into the equivalent values for calibration oil at 2000 psi which are then used automatically to adjust the machining parameter of the EDM apparatus.

A typical method according to the present invention, in which a workpiece in the form of a fuel injection nozzle is machined, comprises the following steps.

1. A signal of a preselected frequency, typically 50 Hz, is injected into the computer 15 as a signal from the flow transducer 19 in order to check that the calibration system is functioning correctly.

2. A fuel injector blank 40 is fitted to the workpiece holder and a first aperture 42 is drilled in the direction of arrow A by the EDM apparatus. The parameters of the EDM apparatus are set to give an aperture of approximately average size which will provide a fluid flow rate of e.g. 32.7 pph (compensated-i.e. when measured using calibration oil at 2000 psi). These parameters are termed medium parameters.

Figure 3:
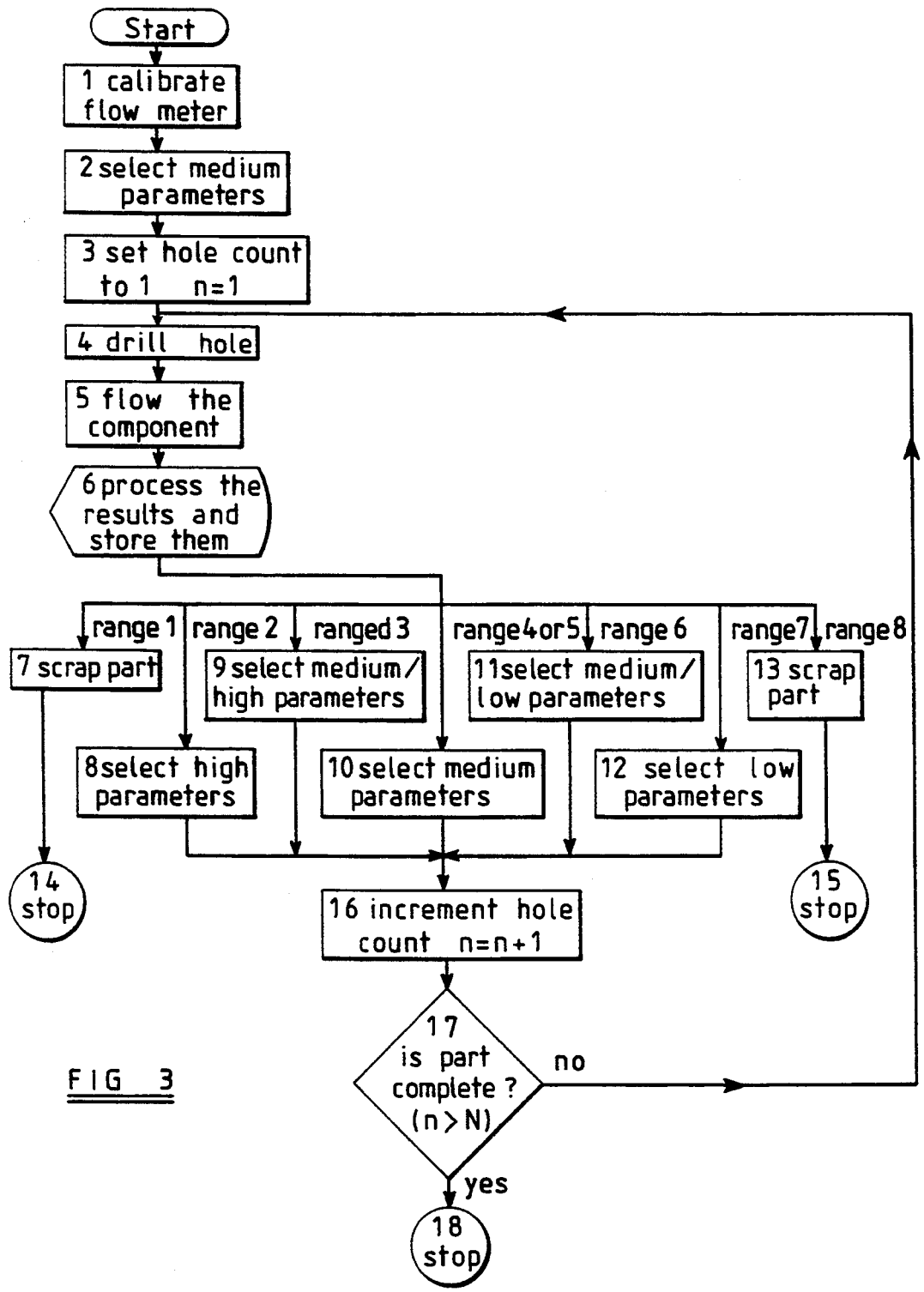
FIG. 3 is a flow diagram of a preferred process for producing a multi-apertured workpiece.
Figure 4:
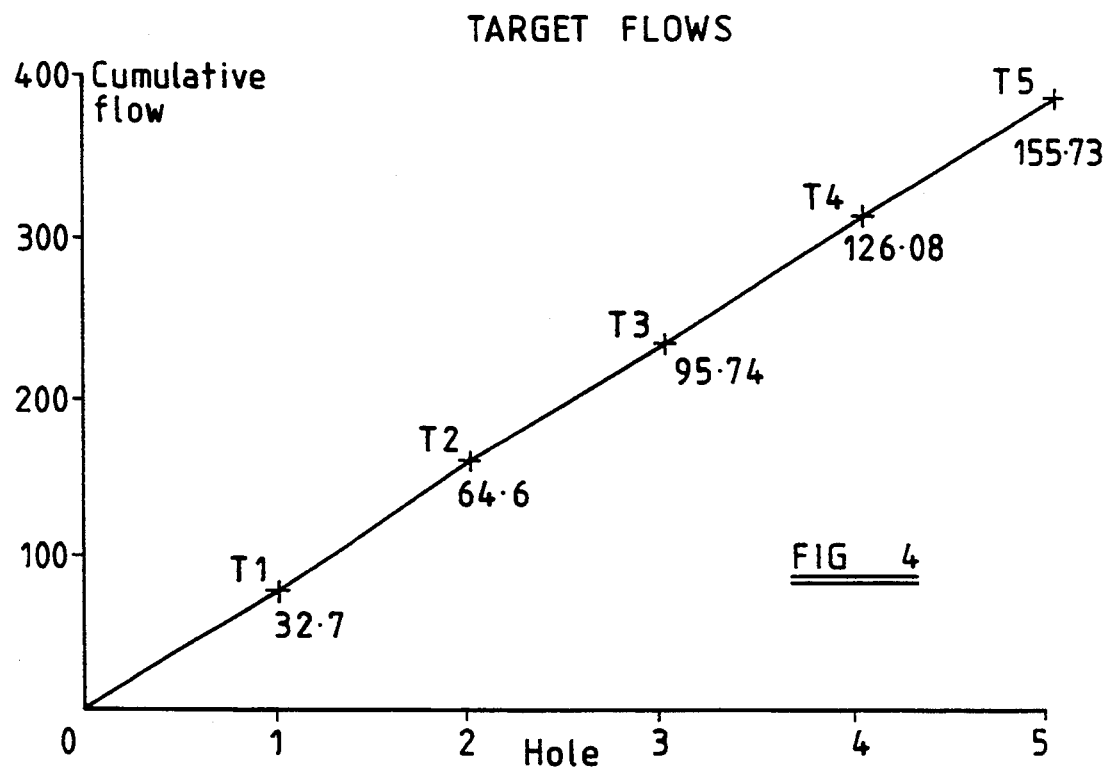
FIG. 4 is a graph showing the desired or target flow rate of fluid through the workpiece apertures in dependence upon the number of apertures.
Figure 6:
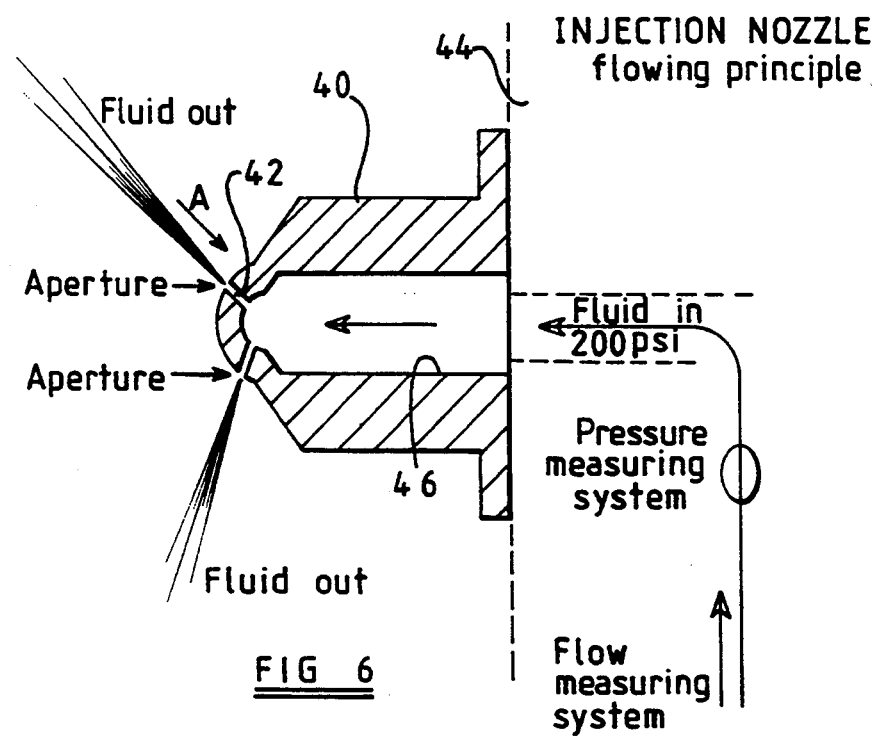
FIG. 6 is a sectional view of a workpiece in the form of an injection nozzle showing the direction of fluid flow through the nozzle during flow testing in between drilling operations.

3
   (a) When the aperture 42 has been drilled, deionised water is pumped through the workpiece holder 44, into the central bore 46 of the workpiece and out of the aperture (FIG. 6). The water pressure is monitored and as soon as it is stable conveniently at marginally below 200 psi, a series of 25 flow rate and pressure readings are taken and averaged by the computer 15.
   (b) The equivalent flow of calibrating oil at 2000 psi is calculated from these figures and the result is compared to the original estimate of 32.7 pph. A higher average flow indicates that the aperture is too large, a lower average flow that the aperture is too small.
   (c) Table I shows the target and desired flow rate figures for a complete machining operation in which eight apertures are machined in an injector nozzle. As can be seen from the table, the target flow rate for one aperture in the nozzle is 32.7 pph (see also FIG. 4) whilst the actual flow measured in steps 3(a) and 3(b) is 30.8813 pph. This is below the target value by 1.818661 pph and if reference is made to the error graph of FIG. 5, it can be seen that this error falls in the error range −1 to −4 which is labelled range 2. As can be seen from the flow chart of FIG. 3 with an error value in range 2 the computer 15 selects "high" machining parameters for the EDM machine so that the second aperture will be drilled with a size sufficient to bring the actual flow rate closer to the target flow rate of 64.60 pph for two apertures. To prevent over correction, a figure of + or − 1.5 pph is allowed for each set of averaged readings before any correction to the machining parameters is made.

Referring to the error graph of FIG. 5, the medium line 50 represents the target value for the flow rate and the possible deviations from this are divided into bands of + and −0.5 (ranges 5 and 4), + and −1 (ranges 6 and 3), + and −4 (ranges 7 and 2) and greater than 4 and less than −4 (ranges 8 and 1). The actual flow rates measured after machining of each aperture of table I are shown as line 52 in the error graph.

4. While step 3 is in process, the workpiece holder is rotated to present a new location to be drilled and the EDM apparatus performs a refeed cycle.

5. The next aperture is drilled using the revised machining parameters and steps 3 and 4 are repeated with the machinery parameter being altered where necessary for subsequent apertures.

Steps 3 and 5 are repeated until eight apertures have been drilled in the injector.

Table I shows the differences between the target equivalent oil flow to obtain an optimum performance and the actual oil flow calculated from the observed water flow. A variation of more than 1.5 pph causes the EDM parameters to be changed to compensate for the error.

TABLE I

| Aperture | Flow pph (compensated) | (target) | mean variation | EDM parameter | Next EDM parameter |
|---|---|---|---|---|---|
| 1 | 30.8813 | 32.7 | −1.818661 | Medium | High |
| 2 | 64.0637 | 64.60 | −.5362854 | High | Medium |
| 3 | 97.0038 | 95.74 | 1.26384 | Medium | Medium |
| 4 | 127.6853 | 126.08 | 1.605255 | Medium | Low |
| 5 | 155.4824 | 155.73 | −.2475739 | Low | Medium |
| 6 | 184.1429 | 184.57 | −.427063 | Medium | Medium |
| 7 | 212.8543 | 212.66 | .1943207 | Medium | Medium |
| 8 | 240.5903 | 240.00 | .5903015 | Medium | Medium |

When the completed injector was tested with calibrating oil at 2000 psi the actual flow was found to be 239.7 pph which is within the desired performance parameters for an injector.

FIGS. 7 to 11 show a modified form of the apparatus of FIGS. 1 and 2 in which a wire electrode 62 is moved laterally during machining of the work-piece.

Referring specifically to FIG. 7, during machining of an aperture in the work-piece the electrode 62 is advanced in the machining direction indicated by arrow B.

The electrode 62 is fed from an EDM head 60 through a nose guide 64 which is of forwardly tapering shape and which is of rectangular cross-section laterally of the machining direction. The nose guide 64 is directly supported by an operating support structure 65 operative to produce controlled orbital movement of the guide 64 in a plane normal to the machining direction B. The support structure 65 comprises a support 66 on which the guide 64 is mounted, a fixed mounting base 67 and an intermediate block 68. The block 68 is fixed to the support 66 and movably connected to the mounting base 67 through an arrangement of piezo-electric devices.

FIG. 9 shows the piezo-electric transducer arrangement in more detail, although the drawing is schematic and certain parts of the assembly are omitted for clarity. The mounting base 67 is in the form of a fixed rectangular frame, within which the intermediate block 68 is suspended by retaining springs 70, so as to be capable of movement relative to the mounting base 67. A pair of piezo-electric transducers 69 and 71 are mounted at right angles to each other between respective sides of the frame forming the mounting base 67 and the intermediate block. The movement of the intermediate block is constrained in the X-direction by an X-slide, not shown, and in the Y-direction by a Y-slide, also not shown. These slides ensure that the movement imparted by the transducers is accurately reflected by the movement of the block 68.

When an electrical control signal is applied to one of the piezo-electric transducers, its length is caused to increase or decrease, either pushing or pulling the intermediate block against the force of the opposing retaining spring. The intermediate block transmits this movement to the support 66 and causes corresponding movement of the nose guide 64 and hence of the electrode.

In the horizontal X-axis direction, the block is movable by the piezo-electric transducer device 69. In the vertical Y-axis direction, the block is movable by the piezo-electric device 71.

The piezo-electric devices 69 and 71 are energised by a control means 76 (forming part of the CNC14) (FIG. 11) so that they operate to produce orbital motion of the electrode 62 during machining such that it forms an aperture 80, the size of which is greater than the diameter of the electrode 62. Thus, the electrode diameter or shape is not critical to the finished hole size. In the example shown in FIG. 4, the devices are energised to produce a circular hole 80, although they may alternatively be relatively energised to produce holes of non-circular cross-section, by application of suitable control signals, for example elliptical apertures or curved slots.

As shown in FIG. 10, the circular hole 80 is machined by applying the same sinusoidal voltage signal to each transducer but with a phase shift of 90°, to produce a resultant circular motion of the electrode 62.

The control means 76 operates to adjust the control signals to the piezo-electric transducers 69 and 71 according to the flow capacity of the previously-produced hole, the flow capacity being measured as described with reference to FIGS. 1 to 6 of the drawings.

The flow rate and pressure readings which are taken and averaged by the computer 15 are compared with the target value as described with reference to FIGS. 1 to 6, and the resulting signal is fed to the control means 76 for the electrode orbital motion. A waveform generator 77 generates a sinusoidal waveform of suitable frequency. The amplitude of the signal produced is determined by the gain control 78, which in turn is determined by the output from the computer 15. A phase shift of 90° is introduced between the sinusoidal signals sent to the piezo-electric transducers as shown in FIG. 10 the transducer 69 receives a sine-wave and the transducer 71 receives a cosine-wave.

Where non-circular holes are to be produced, appropriate signals will need to be fed to the transducers 69 and 71, and the circuitry will differ in a manner apparent to those skilled in the art.

The apparatus described with reference to the drawings uses piezo-electric transducers to provide the orbital motion of the electrode. As an alternative, the control signals could be used to operate DC servo-motors to move the nose guide 64.

As a further alternative, the EDM wire electrode 62 could be held stationary and the component to be machined could be mounted on a workpiece holder, movable in X and Y directions perpendicular to the direction of machining.

Again, this movement could be effected by piezoelectric transducers or by servo-motors in accordance with the control signals.

The apparatus and method described may find particular application in the manufacture of fuel injectors for compression-ignition or "Diesel" engines, where precise control of fuel throughput is most important for the injector nozzles, to reduce pollution to a minimum and achieve maximum efficiency.

I claim:

1. A method of machining a plurality of apertures to produce through-holes in a workpiece, the apertures being produced by electrode discharge machining using an EDM machine, the method comprising the steps of:
   (a) forming a first aperture in said workpiece by electrode discharge machining;
   (b) feeding a calibrating fluid through the first aperture after machining of said first hole is completed;
   (c) measuring flow and pressure of the calibrating fluid flowing through the first aperture upstream thereof and comparing with a predetermined ideal;
   (d) adjusting parameters of the EDM machine in accordance with such comparison so as to compensate for the difference between the measured values of flow and pressure and the predetermined ideal;
   (e) forming a second aperture in the workpiece by electrode discharge machining using the adjusted parameters; and
   (f) repeating the steps (c), (d) and (e) until the appropriate number of apertures has been formed,
wherein the step of forming each of said first and second apertures comprises the steps of:
   taking an electrode, the lateral dimensions of which are less than those of the apertures to be produced;
   producing relative orbital movement between the electrode and the workpiece during machining of the workpiece to produce an aperture;
   and wherein the step of adjusting the operating parameters of the EDM machine comprises producing electrical control signals in response to the comparison of said results for controlling operating means by which said relative orbital motion is produced.

2. A method according to claim 1 wherein said operating means is moved by an arrangement of piezo-electric transducers which are subjected to operating voltages modified in accordance with said control signals to produce orbital motion on X and Y axes in an orbital plane.

3. A method according to claim 1 wherein said operating means is moved on X and Y axes by servo-motor means operating in accordance with said control signals.

4. A method according to claim 1 wherein said operating means moves the electrode.

5. A method according to claim 1 wherein said operating means moves the workpiece.

6. Apparatus for machining a plurality of apertures in the form of through-holes in a workpiece by electrode discharge machining, the apparatus comprising:

a holder for the workpiece;
an EDM machine for forming apertures in the workpiece;
a fluid supply line adapted to supply fluid through a first aperture after the forming of said aperture and prior to the forming of a second aperture;
pressure and flow transducers in said supply line for providing electrical signals representative of the pressure and flow rate of said fluid through said first aperture;
comparator means for comparing said electrical signals with a predetermined ideal;
adjustment means for adjusting operating parameters of the EDM machine in dependance on said comparison prior to forming said second aperture;
an electrode, the lateral dimensions of which are less that those of the apertures to be produced;
operating means for producing relative orbital movement between the electrode and the workpiece during machining of the latter to produce said apertures;
and wherein said adjustment means comprises:
control means for producing resultant electrical control signals in response to the output of said comparator means to control said operating means in dependence thereon.

7. Apparatus according to claim 6 wherein said operating means is adapted to be moved by an arrangement of piezo-electric transducers which are subjected to operating voltages modified in accordance with said control signals to produce orbital motion on X and Y axes in an orbital plane.

8. Apparatus according to claim 7 wherein said operating means is adapted to move the electrode mounted in guide means.

9. Apparatus according to claim 7 wherein said operating means is adapted to move the workpiece mounted on a workpiece holder.

10. Apparatus according to claim 6 wherein said operating means is adapted to be moved on X and Y axes by servo-motor means operating in accordance with said control signals.

* * * * *